US012608953B2

(12) United States Patent     (10) Patent No.:   US 12,608,953 B2

Lukarski et al.     (45) Date of Patent:    Apr. 21, 2026

(54) USING A GAN DISCRIMINATOR FOR ANOMALY DETECTION

(71) Applicant: Toyota Jidosha Kabushiki Kaisha, Toyota (JP)

(72) Inventors: Dimitar H. Lukarski, Sunnyvale, CA (US); Ryan M. Wiesenberg, South Lyon, MI (US); Jeffrey M. Walls, Mountain View, CA (US)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 317 days.

(21) Appl. No.: 18/480,774

(22) Filed: Oct. 4, 2023

(65) Prior Publication Data

US 2025/0118084 A1     Apr. 10, 2025

(51) Int. Cl.
| | |
|---|---|
| *G06V 20/58* | (2022.01) |
| *G06V 10/82* | (2022.01) |
| *G06V 20/56* | (2022.01) |

(52) U.S. Cl.
CPC .............. *G06V 20/58* (2022.01); *G06V 10/82* (2022.01); *G06V 20/588* (2022.01)

(58) Field of Classification Search
None
See application file for complete search history.

(56) References Cited

U.S. PATENT DOCUMENTS

| | | |
|---|---|---|
| 2014/0244153 A1 | 8/2014 | Dorum et al. |
| 2020/0226920 A1* | 7/2020 | Takenaka ......... G08G 1/096775 |
| 2021/0170103 A1 | 6/2021 | Gee et al. |
| 2021/0358115 A1* | 11/2021 | Hever .................... G06N 3/094 |
| 2021/0397835 A1 | 12/2021 | Adler |
| 2022/0146277 A1 | 5/2022 | Lambert et al. |
| 2022/0314993 A1 | 10/2022 | Bagschik et al. |

FOREIGN PATENT DOCUMENTS

| | | |
|---|---|---|
| EP | 2465411 A1 | 6/2012 |
| WO | 2010105712 A1 | 9/2010 |
| WO | 2022035373 A1 | 2/2022 |

* cited by examiner

*Primary Examiner* — Leon Flores

(74) *Attorney, Agent, or Firm* — Christopher G. Darrow; Darrow Mustafa PC

(57) ABSTRACT

Systems, methods, and other embodiments described herein relate to improving the accuracy of sensor data by using a discriminator to identify the presence of anomalies. In one embodiment, a method includes acquiring sensor data about a roadway. The method includes determining a presence of an anomaly within the sensor data using a discriminator from a generative adversarial network (GAN). The method includes generating an indicator for the sensor data according to whether the anomaly is present. The method includes providing the indicator with the sensor data.

20 Claims, 9 Drawing Sheets

180

Input   Transform   conv1   pool1   conv2   pool2   fc3

USING A GAN DISCRIMINATOR FOR ANOMALY DETECTION

TECHNICAL FIELD

The subject matter described herein relates, in general, to identifying anomalies in sensor data about roadways and, more particularly, to using a discriminator from a generative adversarial network (GAN) framework to analyze data for anomalies.

BACKGROUND

Vehicles may be equipped with sensors that facilitate perceiving aspects of a surrounding environment. For example, a vehicle may be equipped with one or more cameras, location sensors, and so on to provide information about the vehicle and the surrounding environment. This sensor data can be useful in various circumstances for deriving trace data that provides for mapping roadways at a lane level according to inferences about the path traveled by the vehicle. That is, trace data can include a path of the vehicle along a roadway depicted by periodic identifications of a location (e.g., GPS location). However, because generating a map in this way requires the acquisition of trace data for all roadways in a network and may further use not just a single pass but multiple passes through a region, acquiring sufficient information that can be trusted as accurate is difficult. That is, in some instances, probe vehicles may encounter difficulties with sensors from various malfunctions, such as hardware failures, perception aberrations due to environmental conditions, etc. Accordingly, using this data can result in errors within maps, thereby frustrating reliance on such maps for precision functions.

SUMMARY

In one embodiment, example systems and methods relate to a manner of improving the accuracy of sensor data by detecting anomalies using a discriminator from a GAN. As previously noted, sensor data may include various aberrations/anomalies due to different issues, such as environmental conditions, hardware errors, and so on. As such, mapping pipelines that rely on the sensor data to generate lane-level maps may encounter difficulties with generating accurate maps.

Therefore, in at least one approach, an inventive system functions to analyze the sensor data using the discriminator, which is able to identify anomalies, thereby preventing the use of data, including errors when generating maps or performing other functions. For example, the discriminator is generally used within the generative adversarial network (GAN) architecture as a way to train another model on a particular task. In the present approach, the discriminator, for example, trains a probe model to synthesize imitation sensor data, such as trace data that includes the positions of vehicles and detections of the vehicles along a roadway. To achieve this, the system configures the discriminator as a classifier that distinguishes between real sensor data and synthesized sensor data from the probe model. Thus, the system feeds the output of the probe model to the discriminator during training. The discriminator is unaware of whether the provided data is real or synthetic since the discriminator is fed both at different times as a way to train the discriminator itself. In any case, whichever data is received, the discriminator classifies the data as real or fake. This functions as a way to train the discriminator to improve identifying real versus fake data, but also functions as a way to train the probe model by propagating a loss value to the probe model when the discriminator determines that synthesized data is indeed synthesized.

As such, the probe model and the discriminator are functioning in a competing and symbiotic manner to train each other for the indicated tasks and improve their respective outputs. In general, the discriminator is identifying inconsistencies, aberrations, and other anomalies within the synthesized data in order to provide feedback to the probe model about the quality of the output. Accordingly, even though the discriminator is intended as a training mechanism for the probe model, the present approach functions to use the learned functionality of the discriminator into identifying actual issues within real sensor data. Thus, after the GAN is trained, the system can then repurpose the discriminator to identify the anomalies the discriminator was originally trained to detect within the output of the probe model, except now within actual real sensor data. As such, the discriminator is fed probe data and/or images and can identify when anomalies are present that may be due to various issues with the sensor data. Thereafter, the system can flag the sensor data as including anomalies and cause the sensor data to be reacquired, discarded, etc. In this capacity, the discriminator functions to prevent data that includes errors by, for example, using orthographic images (e.g., satellite, drone data) to automatically detect anomaly in trace data. In this way, the noted approach improves the acquisition of sensor data and the subsequent generation of maps or other uses of the sensor data by avoiding the inclusion of errors.

In one embodiment, a detection system is disclosed. The detection system includes one or more processors and a memory communicably coupled to the one or more processors. The memory stores instructions that, when executed by the one or more processors, cause the one or more processors to acquire sensor data about a roadway. The instructions include instructions to determine a presence of an anomaly within the sensor data using a discriminator from a generative adversarial network (GAN). The instructions include instructions to generate an indicator for the sensor data according to whether the anomaly is present. The instructions include instructions to provide the indicator with the sensor data.

In one embodiment, a non-transitory computer-readable medium including instructions that, when executed by one or more processors, cause the one or more processors to perform one or more functions is disclosed. The instructions include instructions to to acquire sensor data about a roadway. The instructions include instructions to determine a presence of an anomaly within the sensor data using a discriminator from a generative adversarial network (GAN). The instructions include instructions to generate an indicator for the sensor data according to whether the anomaly is present. The instructions include instructions to provide the indicator with the sensor data.

In one embodiment, a method is disclosed. In one embodiment, the method includes acquiring sensor data about a roadway. The method includes determining a presence of an anomaly within the sensor data using a discriminator from a generative adversarial network (GAN). The method includes generating an indicator for the sensor data according to whether the anomaly is present. The method includes providing the indicator with the sensor data.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
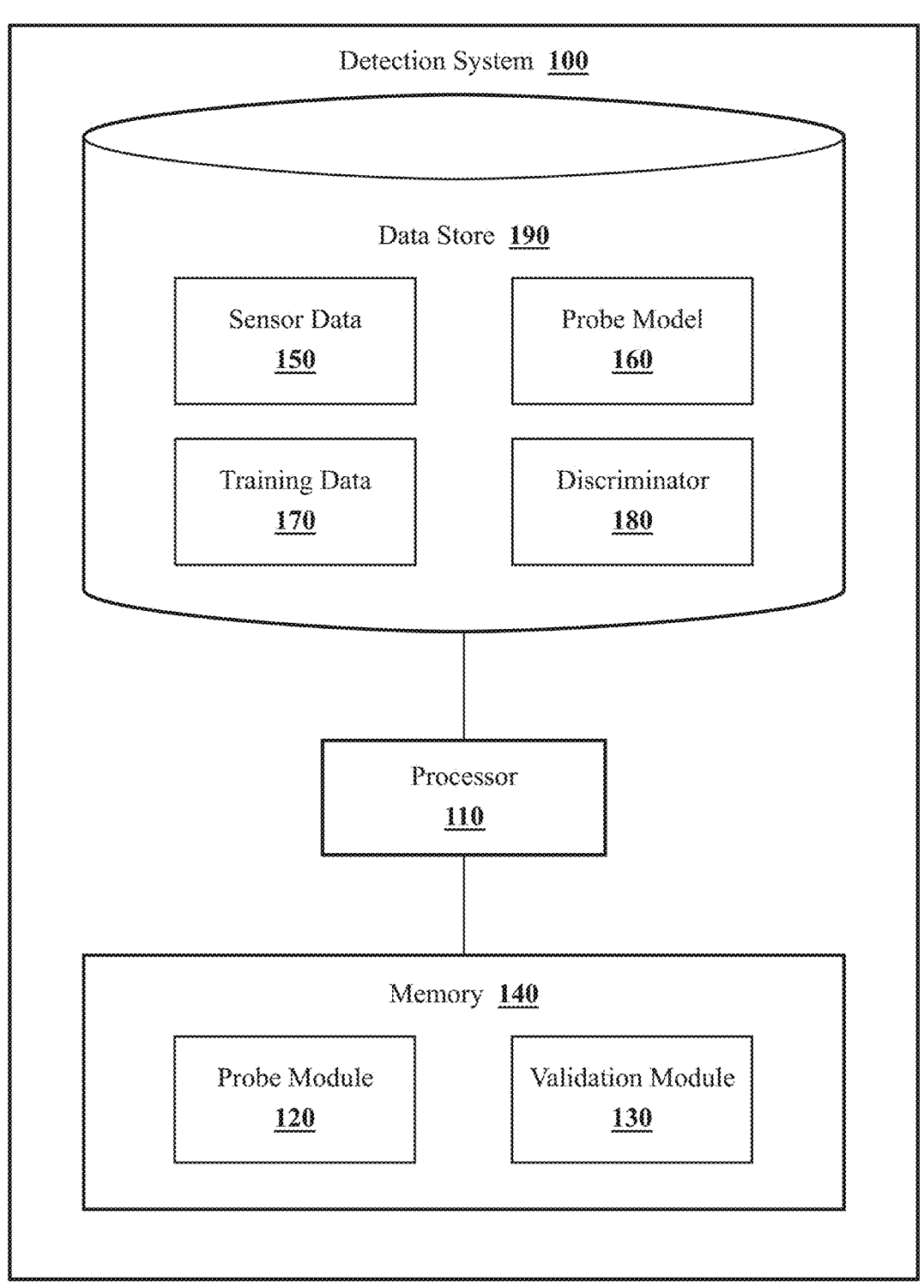
FIG. 1 illustrates one embodiment of a detection system that is associated with using a discriminator to detect anomalies in sensor data.

Systems, methods, and other embodiments associated with improving the accuracy of sensor data by detecting anomalies using a discriminator from a GAN are disclosed. As previously noted, sensor data may include various aberrations/anomalies due to different difficulties, such as environmental conditions, hardware errors, and so on. Therefore, the use of the sensor data without validation can be problematic. For example, mapping pipelines that rely on the sensor data to generate lane-level maps may encounter difficulties with generating accurate maps, autonomous systems that use the sensor data for navigation may encounter reduced accuracy, and so on.

Therefore, in various arrangements, a detection system functions to analyze the sensor data using the discriminator to identify anomalies within the sensor data, thereby preventing the use of data, including errors when generating maps or performing other functions. For example, the discriminator is generally used within the generative adversarial network (GAN) architecture as a way to train another model on a particular task. In the present approach, the discriminator, for example, trains a probe model to synthesize imitation sensor data, such as trace data that includes the positions of vehicles and detections about aspects along the roadway. To achieve this, the system configures the discriminator as a classifier that distinguishes between real sensor data and synthesized sensor data from the probe model.

In one arrangement, the system separately feeds the output of the probe model and real sensor data to the discriminator during training. The discriminator is tasked with classifying the inputs as being real or fake/synthetic. This trains the discriminator to improve identifying real versus fake data, but also trains the probe model by propagating a loss value to the probe model when the discriminator determines that synthesized data is indeed synthesized. As such, the probe model and the discriminator train each other for the indicated tasks and improve their respective outputs.

In general, the discriminator is identifying inconsistencies, aberrations, and other anomalies within the synthesized data in order to provide feedback to the probe model about the quality of the output. Accordingly, even though the discriminator is intended as a training mechanism for the probe model, the present approach functions to reorient the learned functionality of the discriminator into identifying actual anomalies within real sensor data. That is, because anomalies within real sensor data share similarities with anomalies within the synthesized sensor data, the system can repurpose the discriminator after training to identify the anomalies. As such, the discriminator is fed probe data and/or images and can identify when anomalies are present that may be due to various issues with the sensor data. Thereafter, the system can flag the sensor data as including anomalies and cause the sensor data to be reacquired, discarded, etc. In this way, the noted approach improves the acquisition of sensor data and the subsequent generation of maps or other uses of the sensor data by avoiding the inclusion of errors.

With reference to FIG. 1, one embodiment of a detection system 100 is further illustrated. The detection system 100 is shown as including a processor 110, which may be from a vehicle 900 (e.g., processor 910) of FIG. 9 or may be associated with a separate computing device, such as a server, cloud-computing system, and so on. Accordingly, the processor 110 may be a part of the detection system 100, the detection system 100 may include a separate processor from the processor 910 of the vehicle 900, or the detection system 100 may access the processor 110 through a data bus or another communication path.

In one embodiment, the detection system 100 includes a memory 140 that stores a probe module 120 and a validation module 130. The memory 140 is a random-access memory (RAM), read-only memory (ROM), a hard-disk drive, a flash memory, or another suitable memory for storing the modules 120 and 130. The modules 120 and 130 are, for example, computer-readable instructions that when executed by the processor 110 cause the processor 110 to perform the various functions disclosed herein. In alternative arrangements, the modules 120 and 130 are independent elements from the memory 140 that are, for example, comprised of hardware elements (e.g., arrangements of logic gates). Thus, the modules 120 and 130 are alternatively ASICs, hardware-based controllers, a composition of logic gates, or another hardware-based solution.

Figure 2:
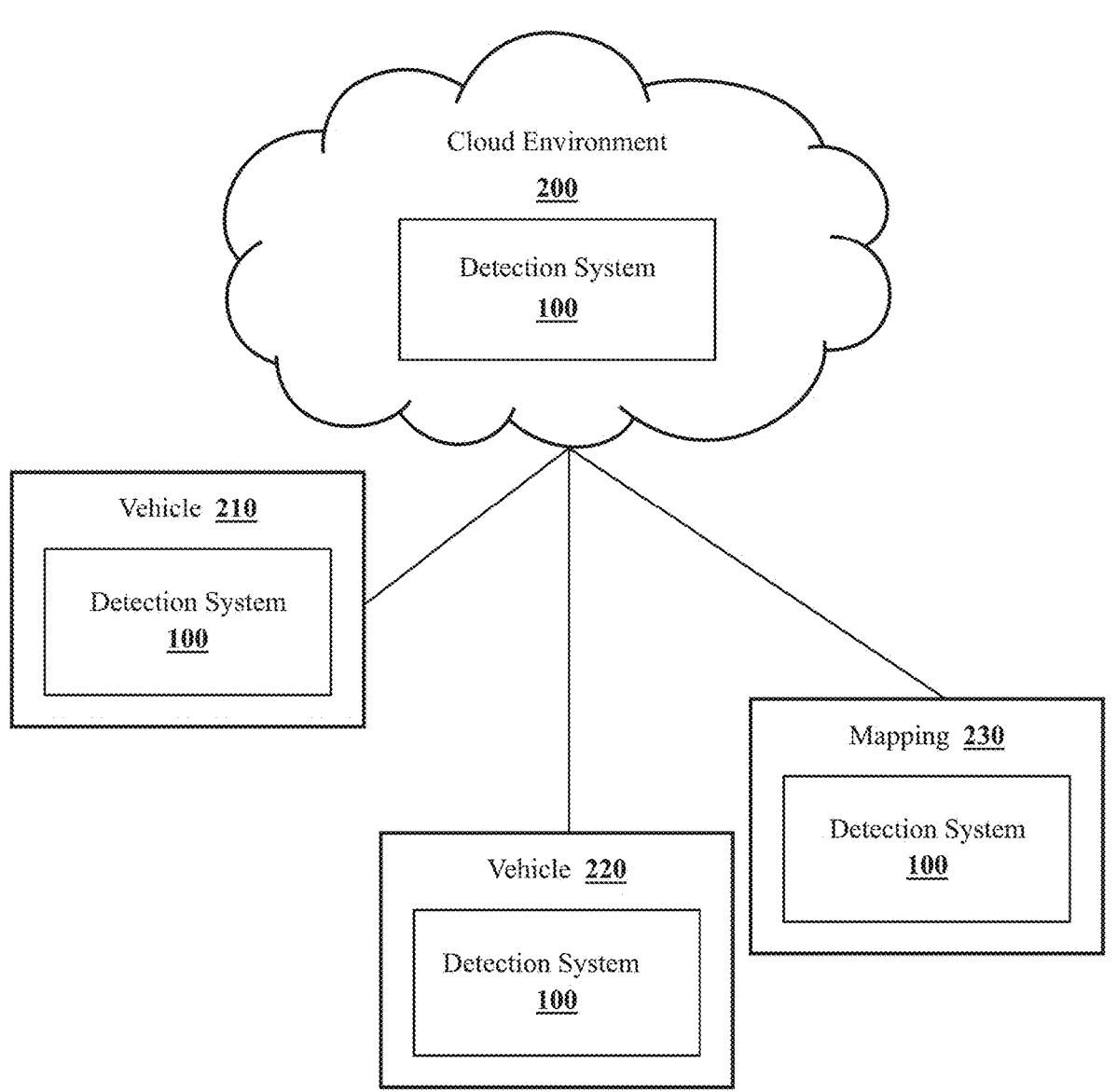
FIG. 2 illustrates one embodiment of the detection system of FIG. 2 in a cloud-computing environment.

The detection system 100, as illustrated in FIG. 1, is generally an abstracted form of the detection system 100 as may be implemented between the vehicle 900 and a cloud-computing environment 200. FIG. 2 illustrates one example of a cloud-computing environment 200 that may be implemented along with the detection system 100. As illustrated in FIG. 2, the detection system 100 is embodied at least in part within the cloud-computing environment 200.

In one or more approaches, the cloud environment 200 may facilitate communications between multiple different vehicles to acquire and distribute information between vehicles 210, 220, and 230. Accordingly, as shown, the detection system 100 may include separate instances within one or more entities of the cloud-based environment 200, such as servers, and also instances within vehicles that function cooperatively to acquire, analyze, and distribute the noted information. In a further aspect, the entities that implement the detection system 100 within the cloud-based environment 200 may vary beyond transportation-related devices and encompass mobile devices (e.g., smartphones), and other devices that may benefit from the functionality and/or generated maps discussed herein. Thus, the set of entities that function in coordination with the cloud environment 200 may be varied.

In one approach, functionality associated with at least one module of the detection system 100 is implemented within the vehicle 900, while further functionality is implemented within a cloud-based computing system. Thus, the detection system 100 may include a local instance at the vehicle 900 and a remote instance that functions within the cloud-based environment.

Moreover, the detection system 100, as provided for herein, may function in cooperation with a communication system. In one embodiment, the communication system communicates according to one or more communication standards. For example, the communication system can include multiple different antennas/transceivers and/or other hardware elements for communicating at different frequencies and according to respective protocols. The communication system, in one arrangement, communicates via a communication protocol, such as a WiFi, DSRC, V2I, V2V, or another suitable protocol for communicating between the vehicle and other entities in the cloud environment. Moreover, the communication system, in one arrangement, further communicates according to a protocol, such as a global system for mobile communication (GSM), Enhanced Data Rates for GSM Evolution (EDGE), Long-Term Evolution (LTE), 5G, or another communication technology that provides for the vehicle communicating with various remote devices (e.g., a cloud-based server). In any case, the detection system 100 can leverage various wireless communication technologies to provide communications to other entities, such as members of the cloud-computing environment.

With continued reference to FIG. 1, in one embodiment, the detection system 100 includes the data store 190. The data store 190 is, in one embodiment, an electronic data structure stored in the memory 140 or another data storage device that is configured with routines that can be executed by the processor 110 for analyzing stored data, providing stored data, organizing stored data, and so on. Thus, in one embodiment, the data store 190 stores data used by the modules 120 and 130 in executing various functions. In one embodiment, the data store 190 stores the sensor data 150, the probe model 160, the training data 170, and the discriminator 180.

The probe module 120 generally includes instructions that function to control the processor 110 to acquire data inputs that form the sensor data 150 and/or the training data 170. In various arrangements, the sensor data 150 may be acquired from separate remote devices, such as satellites, aerial imaging platforms, probe vehicles, and so on. For example, the probe module 120 may communicate directly with the collection mechanisms or through a service that acquires the data and then routes the data to the probe module 120, which is stored as the sensor data 150.

The sensor data 150 can include, in various arrangements, observations of an environment from the perspective of a satellite/drone, from the perspective of a vehicle on a roadway, and/or from another observation platform. Thus, the sensor data 150, in various arrangements, includes orthographic images or other images that are generally overhead images of a roadway and aspects about the roadway, such as lane lines, and so on. The sensor data can further include information acquired from vehicles traversing the roadway and using various sensors to perceive the roadway.

As provided for herein, the probe module 120, in one embodiment, acquires sensor data 150 that includes vehicle location, camera images, and so on. In further arrangements, the probe module 120 acquires the sensor data 150 from further sensors, such as a radar 923, a LiDAR 924, and other sensors as may be suitable for identifying aspects of the roadway and surrounding environment. Moreover, while raw sensor information is described, the probe module 120 may further acquire processed data that forms derived observations of the surrounding environment, such as detections of lane markers, road boundaries, signs, traffic signals, and so on. For example, consider that a vehicle may acquire incomplete observations of a roadway that include trace data (i.e., locations of traversed positions) but do not include detections.

Accordingly, the probe module 120, in one embodiment, controls the respective sensors to provide the data inputs in the form of the sensor data 150 or at least receives the sensor data via one or more intermediaries therefrom. Moreover, the probe module 120 can undertake various approaches to fuse data from multiple sensors when providing the sensor data 150 and/or from sensor data acquired over a wireless communication link (e.g., v2v) from one or more of the surrounding vehicles. Thus, the sensor data 150, in one embodiment, represents a combination of perceptions acquired from multiple sensors and/or entities.

In general, the sensor data 150 includes at least the imaging data. The imaging data includes overhead images of a roadway that may span a defined region, such as a defined distance, a geopolitical area (e.g., a township, county, state, etc.), an area defined according to a format of the data itself, etc. The imaging data generally provides sufficient resolution to resolve features of the roadway, including lane markers. Thus, the imaging data may have a resolution of at least the size of a common lane marking (e.g., about 20-40 cm). In further aspects, the imaging data includes, additionally or alternatively, radar imaging, LiDAR imaging, or another source of imaging data that provides information about the roadway without using a vehicle to explicitly drive through the region. Accordingly, when available, the sensor data 150 may include probe data and imaging data. However, the sensor data 150 need only include a single source for the present approach to function. As an additional clarification, the present disclosure uses the terms trace data and probe data. It should be appreciated that probe data includes trace data (i.e., locations traversed by a vehicle) and may also include detections (i.e., observations of a surrounding environment of a vehicle).

The probe data may include a vehicle trace and detections from the vehicle when synthesized and when collected directly. The vehicle trace is a series of locations of the vehicle as the vehicle traverses the roadway. Thus, the vehicle trace may be a series of points representing the locations of the vehicle connected by line segments. Additionally, the separate points, which are also referred to as frames, may be associated with detections. The detections include information derived from acquired data about the surroundings by the vehicle, such as lane markings, road boundaries, traffic signals, road paint (e.g., crosswalks, lane arrows, etc.), and so on. As such, the sensor data 150 can include a varied set of information depending on availability.

Figure 3:
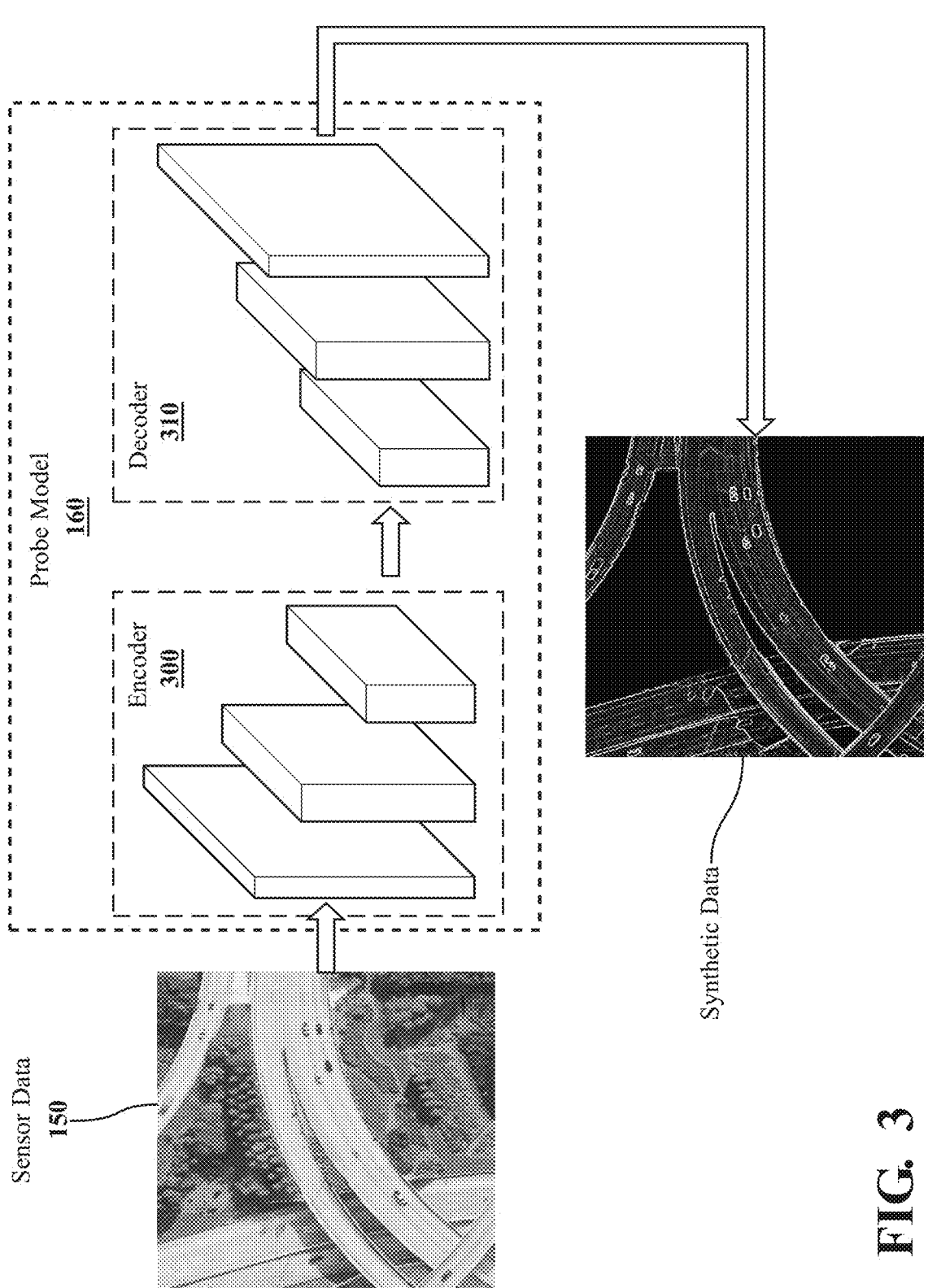
FIG. 3 illustrates one embodiment of a generative neural network.

The probe module 120, in one embodiment, includes instructions that cause the processor 110 to initially acquire the sensor data 150 and then, in at least one approach, process the sensor data 150 using the probe model 160 and/or the discriminator 180. The probe model 160 is, in at least one arrangement, a generative neural network having an encoder-decoder structure. One example of the probe model 160 is illustrated in FIG. 3. As illustrated, the architecture is an encoder/decoder architecture with an encoder 300 and a decoder 310. The configuration of the encoder 300, in one or more approaches, may include a series of layers that include, for example, convolutional layers, pooling layers, and so on. In general, the encoder 300 includes encoding layers arranged in a series that function to reduce spatial dimensions of the sensor data 150 into representations about embedded states of features included therein. The encoder 300, in at least one approach, encodes the sensor data 150 into a latent space that is represented using a feature vector with values for different aspects of the encoded information. The latent space is a spatial representation of possible features encoded by the encoder 300. By contrast, the decoder 310 is, for example, comprised of deconvolutional layers that function to predict the output according to the features provided by the encoder 300.

In further examples, the machine-learning architecture may be characterized as an autoencoder or another type of neural network that generally functions to generate an output having spatial characteristics of the probe data. Moreover, the model 160 is generally implemented within a generative adversarial network (GAN) architecture. That is, to train the probe model 160 another model (i.e., the discriminator 180) is implemented to assess the output of the probe model 160. The particular approach of the training will be described subsequently.

Figure 4:
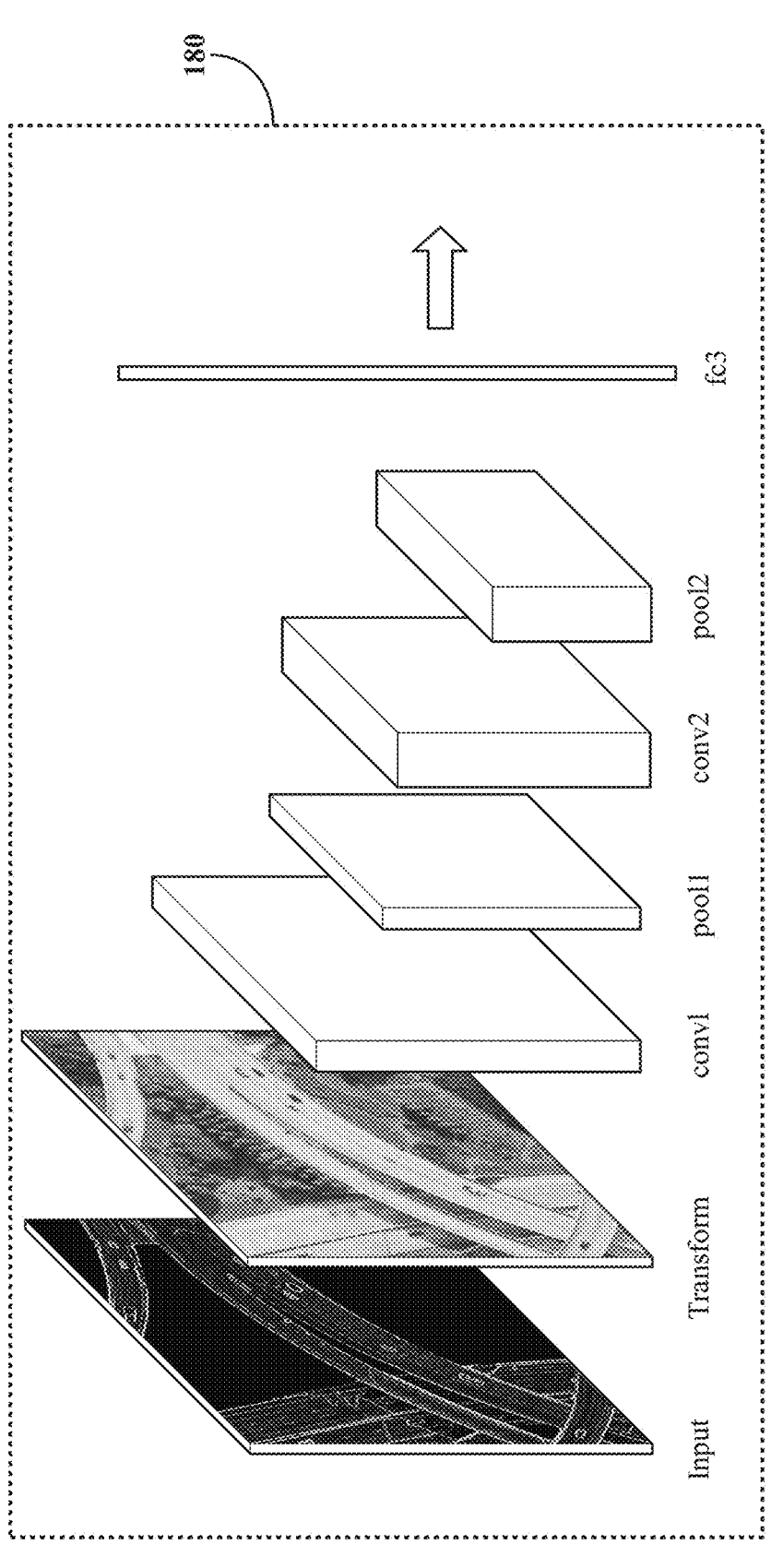
FIG. 4 illustrates an example of a discriminator network.

In regard to the discriminator 180 itself, in one approach, the discriminator 180 is a convolutional neural network (CNN) with a fully connected output layer that provides for classifying the input as either real or fake. One example of the discriminator 180 is illustrated in FIG. 4. As shown, the discriminator 180 is comprised of a series of layers that process the input into representations of features included therein, from which the output layer derives an inference about the nature of the input being real or fake. The input is the output of the probe model 160 or real sensor/probe data. That is, the probe model 160 is configured to generate synthetic information in the form of synthetic probe data. Thus, the input is intended to be the synthetic probe data or real probe data. In various approaches, this may take the form of orthographic image data, and trace data with detections. In any case, the discriminator 180 accepts the data as an input and determines when the provided data is real or fake. Thus, the general goal of training the probe model 160 is to trick the discriminator 180 by synthesizing data that appears to be real. The training process further provides for also training the discriminator 180 by using real sensor data and provides not only the output of the probe model 160 but the real sensor data when training the discriminator 180.

Accordingly, the training data 170 includes, in at least one arrangement, an output from the probe model 160 and real sensor data (e.g., probe data, orthographic images, etc.). In this way, the detection system 100 can train the models through a symbiotic process. Further aspects of the training will be described subsequently. In any case, the models 160/180 are generally integrated with the probe module 120 and/or the validation module 130 and function to process the sensor data 150 and/or the training data to provide the noted outputs. As previously noted, the probe model 160 may intake orthographic images (e.g., satellite, drone images) or a combination of satellite images with sparse probe data of a roadway and produce synthetic probe data that predicts what a vehicle would generate if the vehicle traversed the roadway depicted by the orthographic image. In this way, the detection system 100 is able to provide probe data for a region in which probe data is otherwise unavailable and thereby facilitate the use of existing mapping pipelines to generate lane-level map data for the region. Moreover, through the training process, the detection system 100 also develops the discriminator 180, which can then be repurposed to identify anomalies within the actual sensor data acquired by the system 100.

Figure 5:
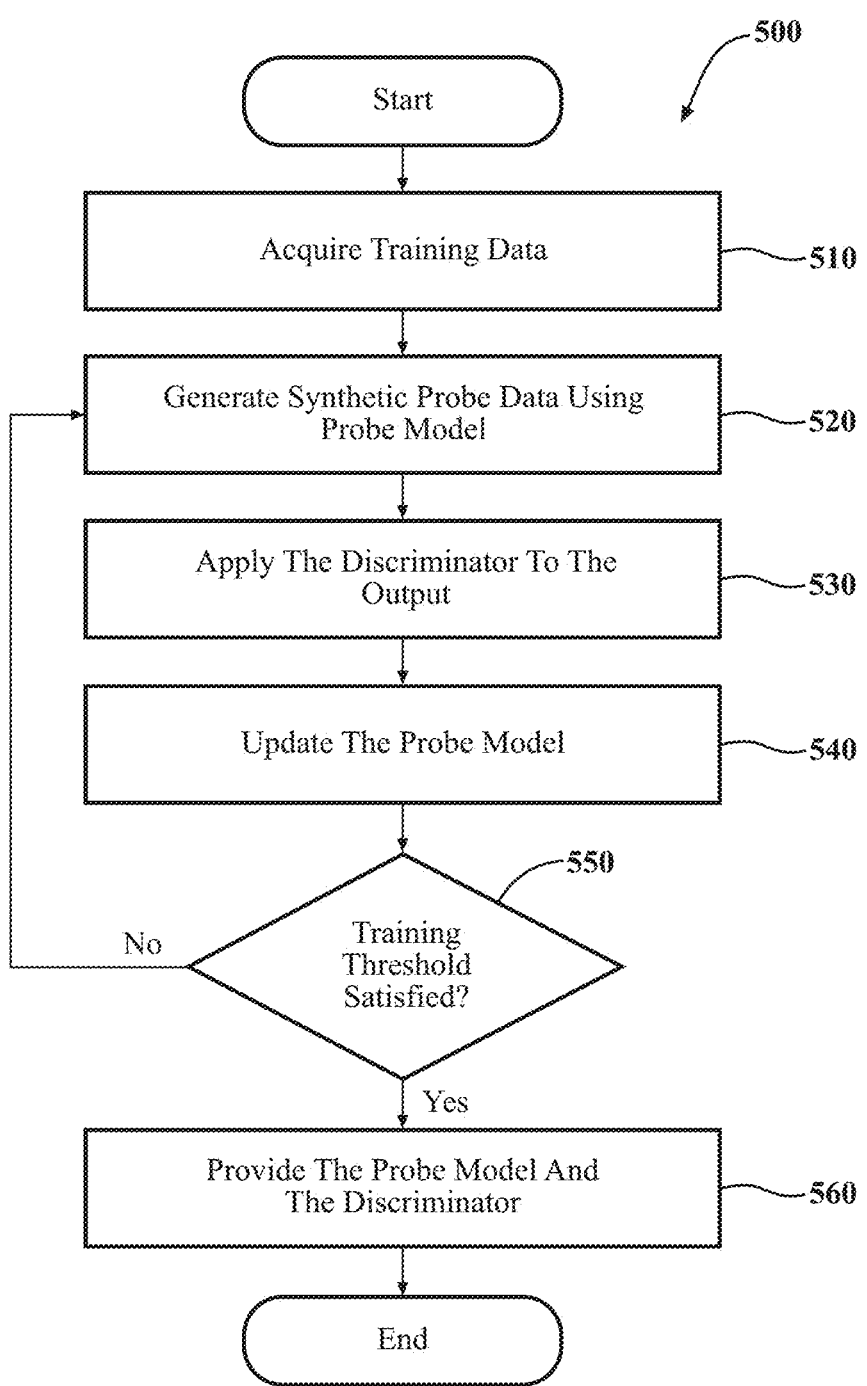
FIG. 5 illustrates a flowchart for one embodiment of a method that is associated with training a model to synthesize probe data using a generative adversarial network.

Additional aspects of training the probe model 160 using a GAN architecture will be discussed in relation to FIG. 5. FIG. 5 illustrates a flowchart of a method 500 that is associated with training a neural network using a GAN architecture. Method 500 will be discussed from the perspective of the detection system 100 of FIG. 1. While method 500 is discussed in combination with the detection system 100, it should be appreciated that the method 500 is not limited to being implemented within the detection system 100 but is instead one example of a system that may implement the method 500. Moreover, to further facilitate the discussion, FIG. 5 will be discussed in combination with FIG. 6, which illustrates a GAN architecture 600.

At 510, the probe module 120 acquires the training data 170. In one example, the training data 170 includes sensor data (e.g., sensor data 150) that the probe model 160 uses as inputs in order to generate synthetic probe data. The training data 170 may further include outputs of the probe model 160 with which to train the discriminator 180. The synthetic probe data is generally intended to imitate actual probe data. Thus, the synthetic probe data may include detections and traces associated with a probe vehicle. In various instances, the synthetic probe data may include sparse real probe data that the probe model 160 supplements by filling in missing information.

At 520, the probe module 120 uses the probe model 160 to generate synthetic probe data. For example, in at least one approach, the probe module 120 encodes the input (e.g., imaging data, etc.) into features using the probe model 160. The features are abstract representations of the attributes of the roadway as provided within the data. In general, the probe module 120 may apply an encoder of the probe model 160 to reduce a spatial representation of the data into the features. The features may be represented using a vector that maps into a latent space of the probe model 160. In one configuration, the encoder 300 is comprised of convolutional layers and pooling layers that function to transform the data into the features. In any case, the features represent an encoded form of the input.

The probe module 120 generates the synthetic probe data from the features using the probe model 160. In general, the probe data is synthetic or otherwise predicted according to the information within the encoded features and is not from an actual vehicle traversing the roadway. The probe model 160 is, for example, trained to generate the probe data in order to imitate real probe data. Thus, the probe data complements or otherwise matches the imaging data for the roadway. Thus, the probe model 160 provides for synthesizing the probe data from the features to imitate a vehicle trace and detections of a vehicle as though the vehicle actually traveled along the roadway. As previously described, the probe data itself is comprised of a vehicle trace and detections. The vehicle trace is comprised of discretized locations of the vehicle at defined periods along a path. Thus, the determinations of location (e.g., GPS-derived location) define points at which the vehicle captures its location and are connected by line segments to form the vehicle trace matching a path of the vehicle along the roadway.

The separate points/determinations of the locations are frames that are associated with different detections that the vehicle would generate at those points about the surrounding environment. When generated at the vehicle, the detections involve processing of sensor data about the surrounding environment through various mechanisms within the vehicle (e.g., automated driving modules) that identify attributes of the environment. The identified attributes of the environment include lane lines, road edge boundaries, markings within the road (e.g., crosswalks, arrows, and other markings), traffic signals, signs, etc., which are provided with, for example, absolute geographic positions. When generated by the probe model 160, the detections include the same information but are derived from inferences of information included in the imaging data and associated with the prediction locations of the vehicle trace. In this way, the probe module 120 synthesizes the probe data as virtual data to imitate a vehicle trace and detections as though a vehicle traversed the roadway.

Figure 6:
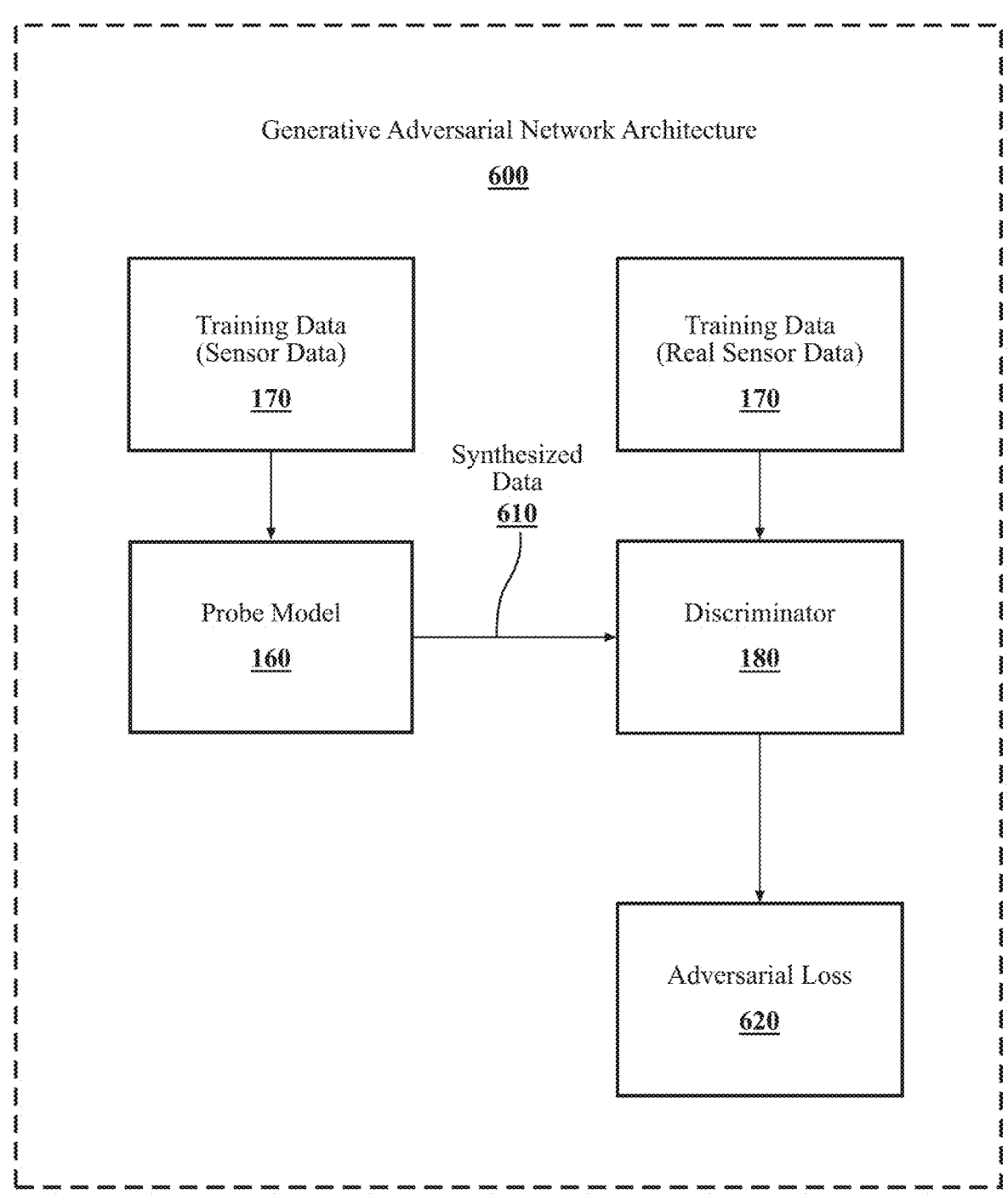
FIG. 6 is a diagram showing an architecture for training with a GAN.

FIG. 6 shows 510 as the probe model 160 receiving the training data 170, and 520 as the probe model 160 generating the synthesized data 610 that is fed into the discriminator 180. It should be appreciated that the discriminator, at 530, is discussed as directly processing the synthetic data output by the probe model 160; however, in various approaches, the discriminator at 530 may process outputs from the probe model 160 in batches. As a further aspect, the discriminator, as shown in FIG. 6, processes real sensor data (e.g., real probe data), which may also occur in batches. Thus, as part of the GAN architecture 600 and training the probe model 160, the system 100 also trains the discriminator 180 by using the discriminator 180 to process the real sensor data.

At 540, the output of the discriminator 180 can be used to generate a loss to update the probe model 160 and the discriminator 180 according to knowledge of whether the input is real or fake. That is, as the discriminator 180 processes the synthetic probe data and provides determinations of whether the synthetic data is classified as real or fake/synthetic, the system 100 can generate an adversarial loss 620 that the system 100 then uses to update the probe model 160. Separately, the same information from processing the output of the probe model 160 can be used to update the discriminator 180 depending on whether the discriminator 180 accurately classifies the output or not. Similarly, the discriminator 180 also processes the real data from the training data 170 to derive further determinations about whether the classifications are accurate. This information can then be used as a separate loss value to update the discriminator 180.

At 550, the probe module 120 determines whether the training is complete. In one or more arrangements, the probe module 120 determines whether a threshold has been satisfied by, for example, identifying whether the accuracy of the probe model 160 has reached an acceptable level (e.g., below a defined error rate for a defined number of results). In a further approach, the threshold defines a number of training iterations overall. In any case, if the training does not satisfy the threshold, then the training continues. Otherwise, the training ends with the detection system 100 providing the probe model 160 and the discriminator 180, at 560, for implementation.

Figure 7:
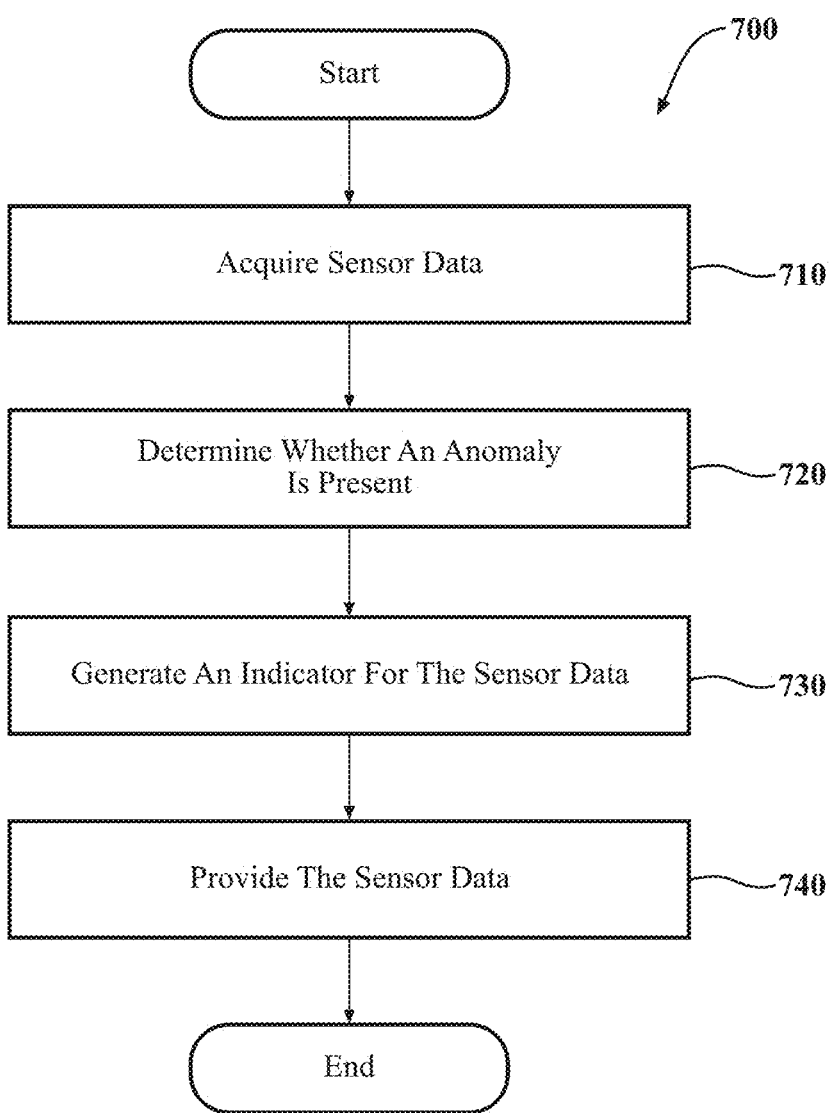
FIG. 7 illustrates a flowchart for one embodiment of a method associated with identifying anomalies within sensor data.

Additional aspects of the detection system 100 will be discussed in relation to FIG. 7. FIG. 7 illustrates a flowchart of a method 700 that is associated with identifying anomalies within sensor data. Method 700 will be discussed from the perspective of the detection system 100 of FIGS. 1, and 2. While method 700 is discussed in combination with detection system 100, it should be appreciated that the method 700 is not limited to being implemented within the detection system 100 but is instead one example of a system that may implement the method 700.

At 710, the validation module 130 acquires the sensor data 150 about a roadway. As previously described, the sensor data 150 may be comprised of various pieces of information depending on, for example, availability. That is, in general, the sensor data 150 includes at least probe data about a roadway but may further include orthographic images of an overhead view of the roadway. The imaging data can be from various sources, such as satellites and so on. The probe data may take different forms but is generally from vehicles traversing the roadway that acquire the probe data from direct observations. For example, the probe data may include a single vehicle trace and detections, a vehicle trace without detections, a vehicle trace with some detections, a sporadic vehicle trace that is missing location information, and so on. The trace data itself is, for example, comprised of separate frames that are detected locations of the vehicle along the roadway. The individual frames may further include detections and a pose.

The detection system 100 may initially accept the probe data and infill the probe data using the probe model 160 to complete the data when portions are missing and provide at least one comprehensive trace with detections to the discriminator 180 for validation. In further aspects, the sensor data 150 is raw data that is not supplemented with synthetic information. In any case, the initially acquired sensor data 150 may take different forms depending on available information.

At 720, the validation module 130 uses the discriminator 180 to determine the presence of an anomaly within the sensor data 150. In at least one arrangement, the discriminator 180 processes defined segments of the sensor data 150, such as a defined number of frames, a defined segment length (e.g., 100 m), or according to another defined quantity, such as a corresponding overhead image size.

The validation module 130 uses the discriminator 180 to process the sensor data 150 and distinguish when the sensor data 150 includes one or more anomalies. Because the discriminator 180 has developed a learned awareness of distinctions between real sensor data and synthetic sensor data, the discriminator 180 is able to identify anomalies within the sensor data 150. In general, the anomalies are aberrations within the sensor data 150 associated with an error in perceiving the roadway. By way of example, the anomaly may be an errant GPS reading, an error in a detection from perturbations within sensor data caused by spurious issues, and so on. Broadly, the anomalies can be any inconsistency and may manifest as, for example, inaccurate detections, inaccurate locations of trace data, and so on. In any case, the discriminator 180 generates an indicator of, for example, real or fake to specify whether the anomaly is present. The real indicator corresponds with anomaly-free data, while the fake/synthetic classification corresponds to the presence of an anomaly, which corresponds to the learned classifications from the GAN training.

At 730, the validation module 130 generates an indicator for the sensor data 150 according to whether the anomaly is present. The indicator may vary depending on the implementation but generally involves flagging the sensor data to identify a presence of the anomaly. Thus, the indicator may be a simple binary flag (yes or no) or may be more specific. For example, in one approach, the validation module 130 generates the indicator with specificity to a particular portion of the sensor data 150 that includes the anomaly, such as a particular frame, detection, etc. In a further approach, the validation module 130 may generate the indicator as a bounding box drawn around the anomalous data. Whichever approach is undertaken, the validation module 130 annotates the sensor data 150 when an anomaly is present in order to either validate the data or induce a subsequent action to resolve the anomaly.

At 740, the validation module 130 provides the indicator with the sensor data 150. In one arrangement, the validation module 130 communicates a request to a set of probe vehicles to acquire additional data about the roadway in an area associated with the anomaly when an anomaly is detected. For example, the system 100 may determine that because of the anomaly, there is insufficient data for providing lane-level maps of an area. Therefore, the system 100 may request one or more probe vehicles within a vicinity of the area associated with the anomaly to acquire new sensor data so that the area can be accurately mapped. Moreover, when the sensor data 150 includes an anomaly, as an alternative to reacquiring the sensor data 150, the detection system 100 may instead use the probe model 160 to synthesize probe data that corrects the anomaly. In this way, the detection system 100 can efficiently generate the probe data for deriving a map of the region.

In yet a further aspect, the system 100 may analyze sensor data for a region and derive an overall confidence in the data according to determinations by the discriminator 180. That is, the system 100 determines whether the sensor data 150 for a region has a confidence value of an acceptable threshold value to use for accurately generating a map. The map may be a medium or high-definition map for use by a vehicle in performing various functions, such as autonomous or semi-autonomous control. For example, in one approach, the probe module 120 uses the probe data to generate a map of the roadway and subsequently control a vehicle using the map according to one or more automated functions (e.g., autonomous control, ADAS, etc.). In this way, the detection system 100 improves the mapping process and downstream functions of vehicles and other entities that rely on the maps by validating the data and synthesizing probe data when necessary. As a further aspect, the indicators within the sensor data that identify the presence of anomalies can be used to focus curators/quality-assurance teams on particular areas of a roadway where errors are present. This may relate to errors within a mapping pipeline or with collection of the sensor data itself. In any case, the ability to focus on anomalous data as opposed to reviewing all of the sensor data directly or through random sampling improves curation of the data by increasing efficiency.

Figure 8:
FIG. 8 illustrates one example of sensor data associated with a roadway that includes an anomaly.

Continuing to FIG. 8, one example of overhead imagery is illustrated along with probe data in the form of a trace, including multiple frames and detections. For example, as shown in FIG. 6, an image includes a roadway 800. The roadway includes various attributes, such as a dashed centerline 810, road edge boundaries 820, and outside lane lines 830. A vehicle trace 840 is also illustrated that is comprised of a series of frames that are points defining determinations from the vehicle about a current location at different times. The frames are further associated with detections at the separate times of the attributes noted above. As shown, the trace includes an anomaly with the frame 850. For example, each of the frames may be 10 m apart; however, the frame 850 is shifted away from a realistic path of the vehicle and in such a manner that the vehicle could not realistically move in the shown trajectory. Accordingly, the discriminator 180, upon processing the probe data of FIG. 8, would identify the frame 850 as including an anomaly and flag the probe data. Depending on the implementation, the discriminator 180 may specifically identify the frame 850 as including the anomaly. At this point, the detection system 100 can remove the frame 850 and synthesize probe data to fill the missing information, thereby still providing useful data for the road segment.

It should be appreciated that FIG. 8 illustrates one type of anomaly, and the discriminator 180 is generally able to detect a wide variety of anomalies. For example, the discriminator 180 can detect anomalies with inaccurate lanes (e.g., bike lanes depicted as vehicle lanes), inaccurate merging of lanes, irregular identifications of lane lines, and so on. In this way, the detection system 100 is able to improve the raw sensor data and thereby improve downstream information and functionality, such as generated maps and ultimately control of robotic systems, including autonomous vehicles according to the improved mappings.

Figure 9:
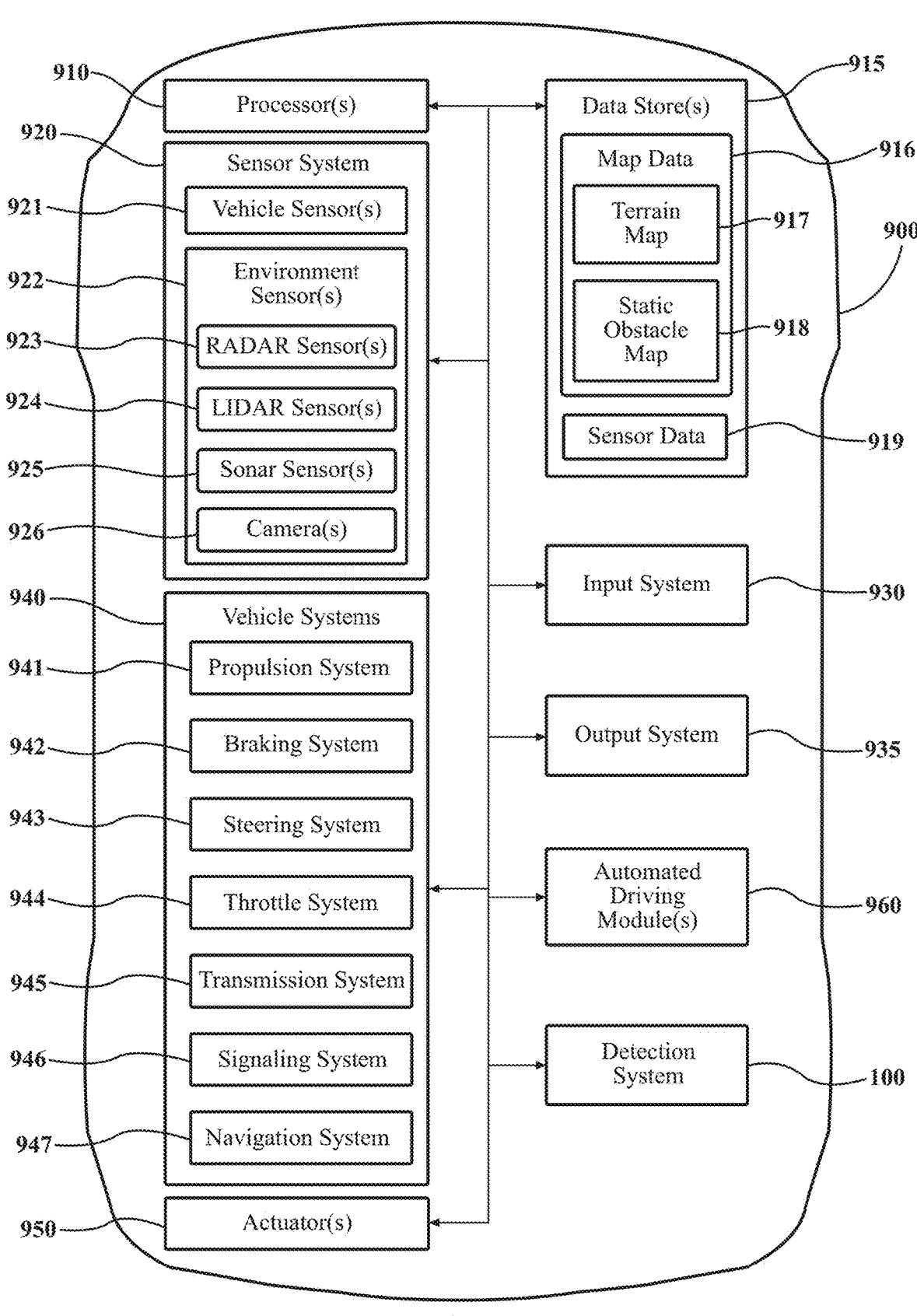
FIG. 9 illustrates one embodiment of a vehicle within which systems and methods disclosed herein may be implemented.

Referring to FIG. 9, an example of a vehicle 900 is illustrated. As used herein, a "vehicle" is any form of transport that may be motorized or otherwise powered. In one or more implementations, the vehicle 900 is an automobile. While arrangements will be described herein with respect to automobiles, it will be understood that embodiments are not limited to automobiles. In some implementations, the vehicle 900 may be a robotic device or a form of transport that, for example, includes sensors to perceive aspects of the surrounding environment, and thus benefits from the functionality discussed herein.

The vehicle 900 also includes various elements. It will be understood that in various embodiments it may not be necessary for the vehicle 900 to have all of the elements shown in FIG. 9. The vehicle 900 can have different combinations of the various elements shown in FIG. 9. Further, the vehicle 900 can have additional elements to those shown in FIG. 9. In some arrangements, the vehicle 900 may be implemented without one or more of the elements shown in FIG. 9. While the various elements are shown as being located within the vehicle 900 in FIG. 9, it will be understood that one or more of these elements can be located external to the vehicle 900. Further, the elements shown may be physically separated by large distances. For example, as discussed, one or more components of the disclosed system can be implemented within a vehicle while further components of the system are implemented within a cloud-computing environment or other system that is remote from the vehicle 900.

It will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In any case, the vehicle 900 includes a detection system 100 that is implemented to perform methods and other functions as disclosed herein relating to improving mapping through synthesizing probe data.

FIG. 9 will now be discussed in full detail as an example environment within which the system and methods disclosed herein may operate. In some instances, the vehicle 900 is configured to switch selectively between an autonomous mode, one or more semi-autonomous modes, and/or a manual mode. "Manual mode" means that all of or a majority of the control and/or maneuvering of the vehicle is performed according to inputs received via manual human-machine interfaces (HMIs) (e.g., steering wheel, accelerator pedal, brake pedal, etc.) of the vehicle 900 as manipulated by a user (e.g., human driver). In one or more arrangements, the vehicle 900 can be a manually-controlled vehicle that is configured to operate in only the manual mode.

In one or more arrangements, the vehicle 900 implements some level of automation in order to operate autonomously or semi-autonomously. As used herein, automated control of the vehicle 900 is defined along a spectrum according to the SAE J3016 standard. The SAE J3016 standard defines six levels of automation from level zero to five. In general, as described herein, semi-autonomous mode refers to levels zero to two, while autonomous mode refers to levels three to five. Thus, the autonomous mode generally involves control and/or maneuvering of the vehicle 900 along a travel route via a computing system to control the vehicle 900 with minimal or no input from a human driver. By contrast, the semi-autonomous mode, which may also be referred to as advanced driving assistance system (ADAS), provides a portion of the control and/or maneuvering of the vehicle via a computing system along a travel route with a vehicle operator (i.e., driver) providing at least a portion of the control and/or maneuvering of the vehicle 900.

With continued reference to the various components illustrated in FIG. 9, the vehicle 900 includes one or more processors 910. In one or more arrangements, the processor(s) 910 can be a primary/centralized processor of the vehicle 900 or may be representative of many distributed processing units. For instance, the processor(s) 910 can be an electronic control unit (ECU). Alternatively, or additionally, the processors include a central processing unit (CPU), a graphics processing unit (GPU), an ASIC, an microcontroller, a system on a chip (SoC), and/or other electronic processing units that support operation of the vehicle 900.

The vehicle 900 can include one or more data stores 915 for storing one or more types of data. The data store 915 can be comprised of volatile and/or non-volatile memory. Examples of memory that may form the data store 915 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, solid-state drivers (SSDs), and/or other non-transitory electronic storage medium. In one configuration, the data store 915 is a component of the processor(s) 910. In general, the data store 915 is operatively connected to the processor(s) 910 for use thereby. The term "operatively connected," as used throughout this description, can include direct or indirect connections, including connections without direct physical contact.

In one or more arrangements, the one or more data stores 915 include various data elements to support functions of the vehicle 900, such as semi-autonomous and/or autonomous functions. Thus, the data store 915 may store map data 916 and/or sensor data 919. The map data 916 includes, in at least one approach, maps of one or more geographic areas. In some instances, the map data 916 can include information about roads (e.g., lane and/or road maps), traffic control devices, road markings, structures, features, and/or landmarks in the one or more geographic areas. The map data 916 may be characterized, in at least one approach, as a medium/high-definition (MD/HD) map that provides information for autonomous and/or semi-autonomous functions.

In one or more arrangements, the map data 916 can include one or more terrain maps 917. The terrain map(s) 917 can include information about the ground, terrain, roads, surfaces, and/or other features of one or more geographic areas. The terrain map(s) 917 can include elevation data in the one or more geographic areas. In one or more arrangements, the map data 916 includes one or more static obstacle maps 918. The static obstacle map(s) 918 can include information about one or more static obstacles located within one or more geographic areas. A "static obstacle" is a physical object whose position and general attributes do not substantially change over a period of time. Examples of static obstacles include trees, buildings, curbs, fences, and so on.

The sensor data 919 is data provided from one or more sensors of the sensor system 920. Thus, the sensor data 919 may include observations of a surrounding environment of the vehicle 900 and/or information about the vehicle 900 itself. In some instances, one or more data stores 915 located onboard the vehicle 900 store at least a portion of the map data 916 and/or the sensor data 919. Alternatively, or in addition, at least a portion of the map data 916 and/or the sensor data 919 can be located in one or more data stores 915 that are located remotely from the vehicle 900.

As noted above, the vehicle 900 can include the sensor system 920. The sensor system 920 can include one or more sensors. As described herein, "sensor" means an electronic and/or mechanical device that generates an output (e.g., an electric signal) responsive to a physical phenomenon, such as electromagnetic radiation (EMR), sound, etc. The sensor system 920 and/or the one or more sensors can be operatively connected to the processor(s) 910, the data store(s) 915, and/or another element of the vehicle 900.

Various examples of different types of sensors will be described herein. However, it will be understood that the embodiments are not limited to the particular sensors described. In various configurations, the sensor system 920 includes one or more vehicle sensors 921 and/or one or more environment sensors. The vehicle sensor(s) 921 function to sense information about the vehicle 900 itself. In one or more arrangements, the vehicle sensor(s) 921 include one or more accelerometers, one or more gyroscopes, an inertial measurement unit (IMU), a dead-reckoning system, a global navigation satellite system (GNSS), a global positioning system (GPS), and/or other sensors for monitoring aspects about the vehicle 900.

As noted, the sensor system 920 can include one or more environment sensors 922 that sense a surrounding environment (e.g., external) of the vehicle 900 and/or, in at least one arrangement, an environment of a passenger cabin of the vehicle 900. For example, the one or more environment sensors 922 sense objects the surrounding environment of the vehicle 900. Such obstacles may be stationary objects and/or dynamic objects. Various examples of sensors of the sensor system 920 will be described herein. The example sensors may be part of the one or more environment sensors 922 and/or the one or more vehicle sensors 921. However, it will be understood that the embodiments are not limited to the particular sensors described. As an example, in one or more arrangements, the sensor system 920 includes one or more radar sensors 923, one or more LIDAR sensors 924, one or more sonar sensors 925 (e.g., ultrasonic sensors), and/or one or more cameras 926 (e.g., monocular, stereoscopic, RGB, infrared, etc.).

Continuing with the discussion of elements from FIG. 9, the vehicle 900 can include an input system 930. The input system 930 generally encompasses one or more devices that enable the acquisition of information by a machine from an outside source, such as an operator. The input system 930 can receive an input from a vehicle passenger (e.g., a driver/operator and/or a passenger). Additionally, in at least one configuration, the vehicle 900 includes an output system 935. The output system 935 includes, for example, one or more devices that enable information/data to be provided to external targets (e.g., a person, a vehicle passenger, another vehicle, another electronic device, etc.).

Furthermore, the vehicle 900 includes, in various arrangements, one or more vehicle systems 940. Various examples of the one or more vehicle systems 940 are shown in FIG. 9. However, the vehicle 900 can include a different arrangement of vehicle systems. It should be appreciated that although particular vehicle systems are separately defined, each or any of the systems or portions thereof may be otherwise combined or segregated via hardware and/or software within the vehicle 900. As illustrated, the vehicle 900 includes a propulsion system 941, a braking system 942, a steering system 943, a throttle system 944, a transmission system 945, a signaling system 946, and a navigation system 947.

The navigation system 947 can include one or more devices, applications, and/or combinations thereof to determine the geographic location of the vehicle 900 and/or to determine a travel route for the vehicle 900. The navigation system 947 can include one or more mapping applications to determine a travel route for the vehicle 900 according to, for example, the map data 916. The navigation system 947 may include or at least provide connection to a global positioning system, a local positioning system or a geolocation system.

In one or more configurations, the vehicle systems 940 function cooperatively with other components of the vehicle 900. For example, the processor(s) 910, the detection system 100, and/or automated driving module(s) 960 can be operatively connected to communicate with the various vehicle systems 940 and/or individual components thereof. For example, the processor(s) 910 and/or the automated driving module(s) 960 can be in communication to send and/or receive information from the various vehicle systems 940 to control the navigation and/or maneuvering of the vehicle 900. The processor(s) 910, the detection system 100, and/or the automated driving module(s) 960 may control some or all of these vehicle systems 940.

For example, when operating in the autonomous mode, the processor(s) 910, the detection system 100, and/or the automated driving module(s) 960 control the heading and speed of the vehicle 900. The processor(s) 910, the detection system 100, and/or the automated driving module(s) 960 cause the vehicle 900 to accelerate (e.g., by increasing the supply of energy/fuel provided to a motor), decelerate (e.g., by applying brakes), and/or change direction (e.g., by steering the front two wheels). As used herein, "cause" or "causing" means to make, force, compel, direct, command, instruct, and/or enable an event or action to occur either in a direct or indirect manner.

As shown, the vehicle 900 includes one or more actuators 950 in at least one configuration. The actuators 950 are, for example, elements operable to move and/or control a mechanism, such as one or more of the vehicle systems 940 or components thereof responsive to electronic signals or other inputs from the processor(s) 910 and/or the automated driving module(s) 960. The one or more actuators 950 may include motors, pneumatic actuators, hydraulic pistons, relays, solenoids, piezoelectric actuators, and/or another form of actuator that generates the desired control.

As described previously, the vehicle 900 can include one or more modules, at least some of which are described herein. In at least one arrangement, the modules are implemented as non-transitory computer-readable instructions that, when executed by the processor 910, implement one or more of the various functions described herein. In various arrangements, one or more of the modules are a component of the processor(s) 910, or one or more of the modules are executed on and/or distributed among other processing systems to which the processor(s) 910 is operatively connected. Alternatively, or in addition, the one or more modules are implemented, at least partially, within hardware. For example, the one or more modules may be comprised of a combination of logic gates (e.g., metal-oxide-semiconductor field-effect transistors (MOSFETs)) arranged to achieve the described functions, an application-specific integrated circuit (ASIC), programmable logic array (PLA), field-programmable gate array (FPGA), and/or another electronic hardware-based implementation to implement the described functions. Further, in one or more arrangements, one or more of the modules can be distributed among a plurality of the modules described herein. In one or more arrangements, two or more of the modules described herein can be combined into a single module.

Furthermore, the vehicle 900 may include one or more automated driving modules 960. The automated driving module(s) 960, in at least one approach, receive data from the sensor system 920 and/or other systems associated with the vehicle 900. In one or more arrangements, the automated driving module(s) 960 use such data to perceive a surrounding environment of the vehicle. The automated driving module(s) 960 determine a position of the vehicle 900 in the surrounding environment and map aspects of the surrounding environment. For example, the automated driving module(s) 960 determines the location of obstacles or other environmental features including traffic signs, trees, shrubs, neighboring vehicles, pedestrians, etc.

The automated driving module(s) 960 either independently or in combination with the detection system 100 can be configured to determine travel path(s), current autonomous driving maneuvers for the vehicle 900, future autonomous driving maneuvers and/or modifications to current autonomous driving maneuvers based on data acquired by the sensor system 920 and/or another source. In general, the automated driving module(s) 960 functions to, for example, implement different levels of automation, including advanced driving assistance (ADAS) functions, semi-autonomous functions, and fully autonomous functions, as previously described.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-9, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. The systems, components and/or processes also can be embedded in a computer-readable storage, such as a computer program product or other data program storage device, readable by a machine, tangibly embodying a program of instructions executable by the machine to perform methods and processes described herein. These elements also can be embedded in an application product which comprises the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. The phrase "computer-readable storage medium" means a non-transitory storage medium. A computer-readable storage medium may be, for example, an electronic, magnetic, optical, electromagnetic, infrared, or semiconductor system, apparatus, or device, or any suitable combination of the foregoing. A non-exhaustive list of the computer-readable storage medium can include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or a combination of the foregoing. In the context of this document, a computer-readable storage medium is, for example, a tangible medium that stores a program for use by or in connection with an instruction execution system or device.

Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through a network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A detection system for identifying anomalies, comprising:
   one or more processors;
   a memory communicably coupled to the one or more processors and storing instructions that, when executed by the one or more processors, cause the one or more processors to:
   acquire sensor data about a roadway;
   determine a presence of an anomaly within the sensor data using a discriminator from a generative adversarial network (GAN), wherein the anomaly is an aberration within the sensor data associated with an error in perceiving the roadway;
   generate an indicator for the sensor data according to whether the anomaly is present; and
   provide the indicator with the sensor data.

2. The detection system of claim 1, wherein the sensor data includes one or more of orthographic images of the roadway, trace data comprised of frames specifying locations and poses of one or more probe vehicles along the roadway, and detections at the frames that are identified aspects of the roadway, including lane boundaries, road boundaries, and road markings.

3. The detection system of claim 1, wherein the instructions to determine the presence of the anomaly include instructions to process the sensor data using the discriminator to distinguish when the sensor data includes the anomaly by leveraging learned awareness of the discriminator in identifying between real information and synthetic information, and
   wherein the instructions to generate the indicator include instructions to flag the sensor data to identify a presence of the anomaly.

4. The detection system of claim 1, wherein the discriminator is a machine-learning model that classifies the sensor data according to a presence of the anomaly.

5. The detection system of claim 1, wherein the instructions further include instructions to train, prior to determining the presence of the anomaly, a probe model of the GAN to synthesize probe data and the discriminator to distinguish between real probe data and synthesized probe data.

6. The detection system of claim 5, wherein the instructions to train the probe model include instructions to use an output of the discriminator to adapt the probe model to improve synthesizing the probe data.

7. The detection system of claim 1, wherein the instructions to provide the indicator with the sensor data include instructions to perform one or more of communicating a request to a set of probe vehicles to acquire additional data about the roadway in an area associated with the anomaly, and generating a map using accumulated data that has been identified as not including the anomaly.

8. The detection system of claim 7, wherein the instructions to provide the indicator include instructions to use the map to control a vehicle to navigate the roadway.

9. A non-transitory computer-readable medium including instructions that, when executed by one or more processors, cause the one or more processors to:

acquire sensor data about a roadway;

determine a presence of an anomaly within the sensor data using a discriminator from a generative adversarial network (GAN), wherein the anomaly is an aberration within the sensor data associated with an error in perceiving the roadway;

generate an indicator for the sensor data according to whether the anomaly is present; and provide the indicator with the sensor data.

10. The non-transitory computer-readable medium of claim 9, wherein the sensor data includes one or more of orthographic images of the roadway, trace data comprised of frames specifying locations and poses of one or more probe vehicles along the roadway, and detections at the frames that are identified aspects of the roadway, including lane boundaries, road boundaries, and road markings.

11. The non-transitory computer-readable medium of claim 9, wherein the instructions to determine the presence of the anomaly include instructions to process the sensor data using the discriminator to distinguish when the sensor data includes the anomaly by leveraging learned awareness of the discriminator in identifying between real information and synthetic information, and wherein the instructions to generate the indicator include instructions to flag the sensor data to identify a presence of the anomaly.

12. The non-transitory computer-readable medium of claim 9, wherein the discriminator is a machine-learning model that classifies the sensor data according to a presence of the anomaly.

13. The non-transitory computer-readable medium of claim 9, wherein the instructions further include instructions to train, prior to determining the presence of the anomaly, a probe model of the GAN to synthesize probe data and the discriminator to distinguish between real probe data and synthesized probe data.

14. A method, comprising:

acquiring sensor data about a roadway;

determining a presence of an anomaly within the sensor data using a discriminator from a generative adversarial network (GAN), wherein the anomaly is an aberration within the sensor data associated with an error in perceiving the roadway;

generating an indicator for the sensor data according to whether the anomaly is present; and providing the indicator with the sensor data.

15. The method of claim 14, wherein the sensor data includes one or more of orthographic images of the roadway, trace data comprised of frames specifying locations and poses of one or more probe vehicles along the roadway, and detections at the frames that are identified aspects of the roadway, including lane boundaries, road boundaries, and road markings.

16. The method of claim 14, wherein determining the presence of the anomaly includes processing the sensor data using the discriminator to distinguish when the sensor data includes the anomaly by leveraging learned awareness of the discriminator in identifying between real information and synthetic information, and wherein generating the indicator includes flagging the sensor data to identify a presence of the anomaly.

17. The method of claim 14, wherein the discriminator is a machine-learning model that classifies the sensor data according to a presence of the anomaly.

18. The method of claim 14, further comprising:

training, prior to determining the presence of the anomaly, a probe model of the GAN to synthesize probe data and the discriminator to distinguish between real probe data and synthesized probe data.

19. The method of claim 18, wherein training the probe model includes using an output of the discriminator to adapt the probe model to improve synthesizing the probe data.

20. The method of claim 14, wherein providing the indicator with the sensor data includes one or more of communicating a request to a set of probe vehicles to acquire additional data about the roadway in an area associated with the anomaly, and generating a map using accumulated data that has been identified as not including the anomaly.

* * * * *